United States Patent
Cook, Jr. et al.

(10) Patent No.: US 9,032,661 B2
(45) Date of Patent: May 19, 2015

(54) DIVING LIP FOR A FISHING LURE

(75) Inventors: Victor J. Cook, Jr., Columbus, OH (US); Grant Koppers, Niagara On The Lake (CA)

(73) Assignee: KOPPERS FISHING AND TACKLE CORP, Niagara-on-the-Lake (CA)

( * ) Notice: Subject to any disclaimer, the term of this patent is extended or adjusted under 35 U.S.C. 154(b) by 548 days.

(21) Appl. No.: 13/485,190

(22) Filed: May 31, 2012

(65) Prior Publication Data

US 2013/0318858 A1  Dec. 5, 2013

(51) Int. Cl.
  *A01K 85/00* (2006.01)
  *A01K 85/16* (2006.01)

(52) U.S. Cl.
  CPC ..................................... *A01K 85/16* (2013.01)

(58) Field of Classification Search
  USPC .............................................. 43/42.47, 42.49
  See application file for complete search history.

(56) References Cited

U.S. PATENT DOCUMENTS

| | | | | |
|---|---|---|---|---|
| 2,794,287 A | * | 6/1957 | Mancuis, Jr. ................ | 43/42.02 |
| 2,945,318 A | * | 7/1960 | Lassiter ...................... | 43/42.47 |
| 3,205,609 A | * | 9/1965 | Knapton ..................... | 43/42.09 |
| 3,367,057 A | * | 2/1968 | Pond .......................... | 43/42.02 |
| 4,215,507 A | * | 8/1980 | Russell ....................... | 43/42.22 |
| 4,671,006 A | * | 6/1987 | Schuyler, Jr. ............... | 43/42.48 |
| 5,477,634 A | * | 12/1995 | Welcome .................... | 43/42.48 |
| 5,490,347 A | * | 2/1996 | Conley ........................ | 43/42.47 |
| 5,600,916 A | | 2/1997 | Smith | |
| 6,578,313 B1 | | 6/2003 | Knol | |
| 7,107,720 B2 | | 9/2006 | Burggabe et al. | |
| 2008/0155884 A1 | * | 7/2008 | Sisson ......................... | 43/42.47 |
| 2013/0192121 A1 | * | 8/2013 | Ford ........................... | 43/42.22 |

FOREIGN PATENT DOCUMENTS

GB  2456678 A  *  7/2009

* cited by examiner

*Primary Examiner* — Christopher P Ellis
(74) *Attorney, Agent, or Firm* — WM. Cates Rambo

(57) ABSTRACT

The diving lip projects from the front of a fishing lure that has a longitudinal axis and a fishing line connecting loop. The diving lip has rear, intermediate and front sections. Each of the sections has an upper surface. The fishing line connecting loop is positioned between the rear and intermediate upper surfaces. The rear upper surface extends at a downwardly inclined angle α relative to a plane that is approximately parallel to the longitudinal axis of the lure. The intermediate upper surface extends at a downwardly inclined angle β relative to another plane that is approximately parallel to the lure's longitudinal axis. The angle β is larger than angle α. The front section extends approximately parallel to the lure's longitudinal axis.

12 Claims, 4 Drawing Sheets

DIVING LIP FOR A FISHING LURE

BACKGROUND

The present diving lip or bill relates generally to depth-controlling structures projecting from the front of fishing lures and more particularly to the shapes and relative positions of such structures.

Diving lips are designed to urge the fishing lure downwardly in the water as the angler reels it in or when the lure is trolled behind a boat. It is believed that the diving lip also imparts a side-to-side, wiggle or wobble movement to the lure to make it more attractive to game fish.

Heretofore, diving lips have been relatively simple in shape. Typically, they have been formed with a generally planar upper, or water-driving, surface extending from the lower front or mid-front of the lure. Shallow diving lips are relatively small and project at a relatively steep downward angle. Intermediate depth lips are larger and project at a shallower downward angle. Deep diving lips are the largest and project at an even shallower downward angle, if not horizontally, from the lure.

These relatively simply shaped diving lips did not enable lures to move sufficiently realistically through the water, from the present inventors' perspective. While prior art diving lips were effective at positioning the lure at a desired depth, the lures tended to move angularly, rather than horizontally, through the water even after the desired depth was reached. In contrast, live bait fish may angle their mouths downwardly when feeding or diving, but they typically move through the water at any particular depth with their bodies horizontally disposed.

SUMMARY

The present diving lip extends longitudinally from the front of a fishing lure. It may comprise rear, intermediate and front sections. Each section may have an upper surface. The upper surface of the rear section may be disposed at a first downwardly inclined angle relative to a horizontal plane. The upper surface of the intermediate section may extend from the upper surface of the rear section at a second and larger downwardly inclined angle. A first portion of the upper surface of the front section may extend from the upper surface of the intermediate section generally parallel to the horizontal plane and a second portion may be upwardly inclined relative to the horizontal plane. A fishing line connector may be accessible between the upper surfaces of the rear and intermediate sections of the diving lip.

DETAILED DESCRIPTION OF AN EXEMPLARY EMBODIMENT

Figure 1:
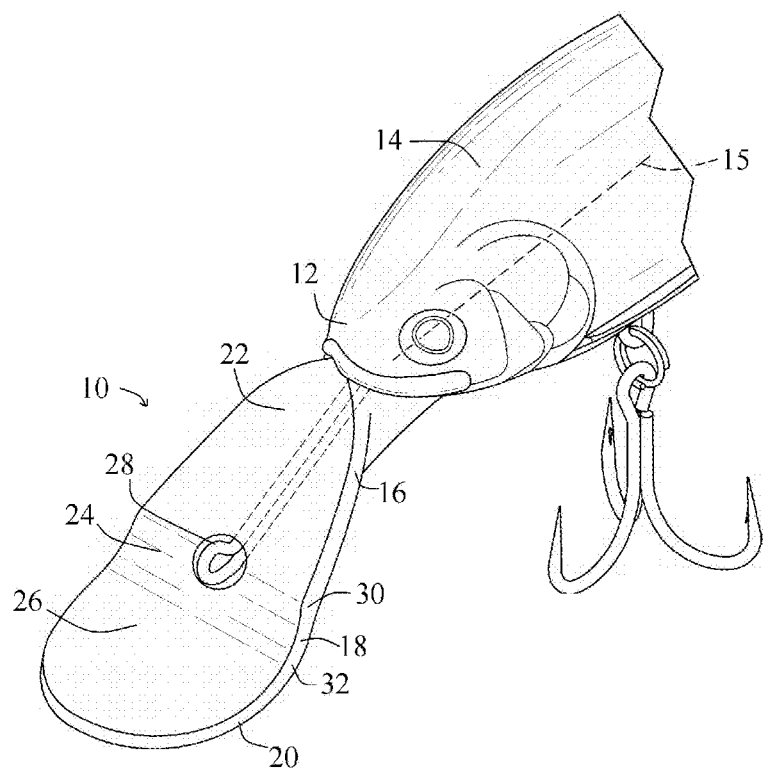
FIG. 1 is a perspective view of an exemplary embodiment of the diving lip projecting from a front portion of a fishing lure.
Figure 4:
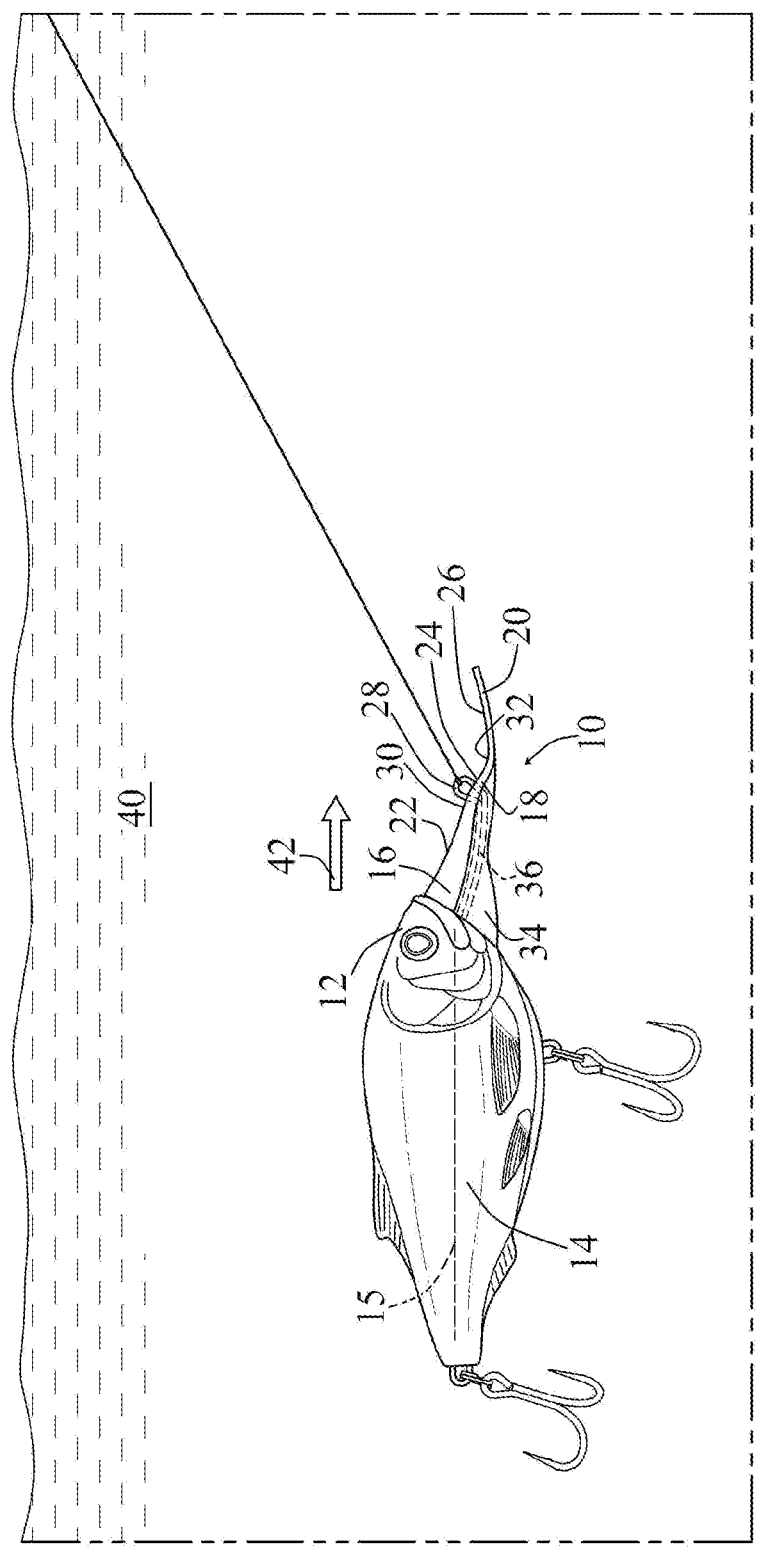
FIG. 4 is a reduced side view of the diving lip and lure moving through water.

As shown in FIGS. 1 and 4, the diving lip, generally designated 10, projects from the front 12 of a fishing lure 14 having a longitudinal axis 15. The diving lip may comprise rear 16, intermediate 18 and front 20 sections. Each section may have a concave upper surface 22, 24, 26, respectively. A line-connecting loop 28 may be disposed between the rear and intermediate upper surfaces 22, 24. A convex transition zone 30 may be formed between the rear and intermediate upper surfaces 22, 24, and the loop 28 may project therefrom. A concave transition zone 32 may be formed between the mid and front upper surfaces 24, 26. Lower portions of the rear and intermediate sections 16, 18 may be formed with a keel 34 that emerges from the lower front 12 of the lure and ends by merging into an underside of the forward section 20 of the diving lip.

Figure 2:
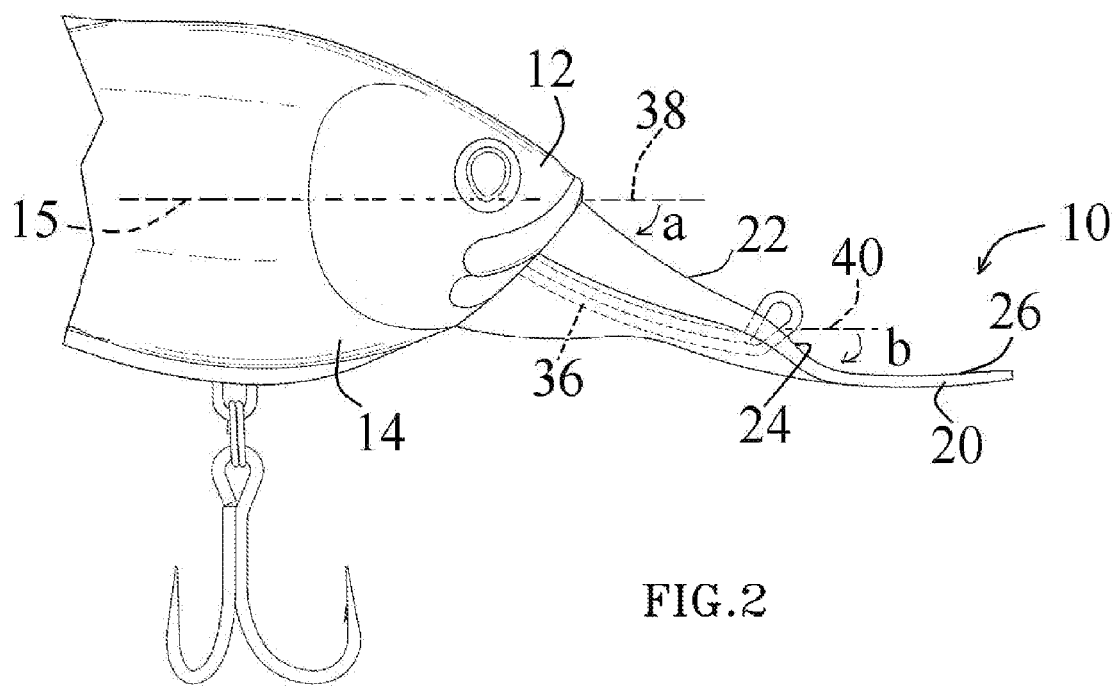
FIG. 2 is a side view of the diving lip and the front portion of the lure.

As shown in FIG. 2, the rear upper surface 22 may be disposed at a downwardly inclined angle α relative to a first plane 38 that is parallel to the longitudinal axis 15 of the lure. The intermediate or mid-upper surface 24 may be disposed at a downwardly inclined angle β relative to a second plane 40 that is parallel to the lure's longitudinal axis. Angle β may be larger than angle α. For instance, angle α may be between 25° and 35°, and angle β may be between 45° and 55°. The front section 20 may be disposed approximately parallel to the lure's longitudinal axis.

The lure 14 and the diving lip 10 may be formed as follows. Suitable thermoplastic material, such as a polycarbonate resin for the diving lip, may be set in molds (not shown) to form left and right halves of the lure and diving lip. In this manner, each of the left half lure and lip structure and the right half lure and lip structure may be of integral, one piece construction. Prior to joining the left and right halves together, wire through materials 36, guide pins and weights (not shown) may be installed, then the left and right halves may be welded together.

Figure 3:
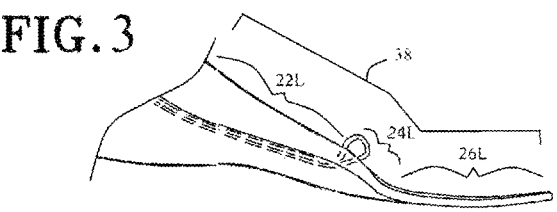
FIG. 3 is a fragmentary side view of the diving lip.

As shown in FIG. 3, the length 22L of the rear section upper surface may be between 45 and 50% of the total side profile length 38 of the diving lip. The midsection upper surface length 24L may be between 15 and 20% of the profile length, and the front upper surface length 26L may be between 30 and 40% thereof. More particularly, the rear upper surface may be 47%, the midsection upper surface 18% and the front upper surface 35% of the side profile length of the diving lip. As may be readily understood, the size of the diving lip may depend upon the size of the fishing lure 14. For example, if the lure is about 5 inches long, the diving lip may be about 2.75 inches long in side profile.

As shown in FIG. 4, the long axis 15 of the fishing lure 14 equipped with the above-specified diving lip 10 remains generally horizontal as the lure moves through the water 40 in the direction 42. This effect is believed to be result of the relative proportions of the upper surfaces of the rear, intermediate and front sections, their curvature and angular arrangement, and the position of the line-connecting loop 28.

The foregoing detailed description of an exemplary form of the present diving lip and is not intended to unduly limit the scope of the present invention. It is believed that many variations from the exemplary embodiment as shown and described made be made without departing from the scope of one or more of the following claims.

The invention claimed is:

1. A diving lip projecting from the front of a fishing lure having a longitudinal axis and a fishing line connecting loop, said diving lip comprising:

rear, intermediate and front sections, each of said sections having an upper surface;

the fishing line connecting loop being disposed between the rear and intermediate upper surfaces;

said rear upper surface being disposed at a downwardly inclined angle α relative to a first plane, said first plane being approximately parallel to the longitudinal axis of the lure;

said intermediate upper surface being disposed at a downwardly inclined angle β relative to a second plane, said second plane being approximately parallel to said longitudinal axis;

said angle β being larger than angle α; and the front section of the diving lip being disposed approximately parallel to the longitudinal axis of said lure.

2. The diving lip according to claim 1, wherein at least one of the upper surfaces of the rear, intermediate and front sections is concave.

3. The diving lip according to claim 1, wherein the upper surfaces of the rear, intermediate and front sections may comprise between 45 and 50%, between 15 and 20% and between 30 and 40%, respectively, of the longitudinal extent of diving lip.

4. The diving lip according to claim 1, and further comprising a convex transition zone disposed between the rear and intermediate upper surfaces.

5. The diving lip according to claim 4, wherein the fishing line connector loop projects from the convex transition zone.

6. The diving lip according to claim 1, and further comprising a concave transition zone disposed between the intermediate and front upper surfaces.

7. The diving lip according to claim 1, and further comprising a keel extending from the lure along lower portions of the rear and intermediate sections of the diving lip.

8. The diving lip according to claim 1, wherein the angle α is between 25° and 35°, and the angle β is between 45° and 55°.

9. The diving lip according to claim 1, wherein the rear upper surface is between 45 and 50% of a total side profile length of the diving lip.

10. The diving lip according to claim 9, wherein the intermediate upper surface is between 15 and 20% of said side profile length.

11. The diving lip according to claim 9, wherein the front upper surface is between 30 and 40% of said side profile length.

12. The diving lip according to claim 1, wherein the longitudinal axis of the fishing lure is generally horizontally disposed as the lure moves through water.

* * * * *